US012681267B2

(12) United States Patent
Jung et al.

(10) Patent No.: US 12,681,267 B2
(45) Date of Patent: Jul. 14, 2026

(54) OPTICAL IMAGING SYSTEM

(71) Applicant: Samsung Electro-Mechanics Co., Ltd., Suwon-si (KR)

(72) Inventors: Jin Hwa Jung, Suwon-si (KR); Yong Joo Jo, Suwon-si (KR); Young Suk Kang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 202 days.

(21) Appl. No.: 18/610,632

(22) Filed: Mar. 20, 2024

(65) Prior Publication Data

US 2024/0219687 A1 Jul. 4, 2024

Related U.S. Application Data

(63) Continuation of application No. 17/206,284, filed on Mar. 19, 2021, now Pat. No. 11,966,100, which is a
(Continued)

(30) Foreign Application Priority Data

Jun. 1, 2018 (KR) ........................ 10-2018-0063714

(51) Int. Cl.
*G02B 9/62* (2006.01)
*G02B 13/02* (2006.01)
*G02B 27/00* (2006.01)

(52) U.S. Cl.
CPC .............. *G02B 9/62* (2013.01); *G02B 13/02* (2013.01); *G02B 27/0025* (2013.01)

(58) Field of Classification Search
CPC ...... G02B 9/62; G02B 13/02; G02B 27/0025; G02B 13/0045; G02B 13/0015; G02B 13/18
See application file for complete search history.

(56) References Cited

U.S. PATENT DOCUMENTS 6,181,487 B1 1/2001 Yoneyama et al.
10,268,019 B2 4/2019 Chen et al.
(Continued)

FOREIGN PATENT DOCUMENTS

CN 105022140 A 11/2015
CN 105022145 A 11/2015
(Continued)

OTHER PUBLICATIONS

Chinese Office Action issued on Apr. 2, 2021, in counterpart Chinese Patent Application No. 201910255858.5 (10 pages in English, 9 pages in Chinese).
(Continued)

*Primary Examiner* — Tuyen Tra
(74) *Attorney, Agent, or Firm* — NSIP Law

(57) ABSTRACT
An optical imaging system includes a first lens, a second lens, a third lens including a concave object side surface, a fourth lens, a fifth lens, and a sixth lens sequentially disposed from an object side toward an image side. The optical imaging system satisfies 0.7<TL/f<1.0 and F No.<2.1, where TL is a distance from an object side of the first lens to an imaging plane, f is a total focal length of the optical imaging system, and F No. is the F No. of the optical imaging system.

12 Claims, 6 Drawing Sheets

Related U.S. Application Data continuation of application No. 16/237,819, filed on Jan. 2, 2019, now Pat. No. 10,983,306.

(56)                    References Cited

U.S. PATENT DOCUMENTS

| | | | |
|---|---|---|---|
| 10,281,682 | B2 | 5/2019 | Lee et al. |
| 10,302,911 | B2 | 5/2019 | Lee et al. |
| 10,466,444 | B2 | 11/2019 | Chen et al. |
| 10,605,963 | B2 | 3/2020 | Dai et al. |
| 10,983,306 | B2 | 4/2021 | Jung et al. |
| 11,231,563 | B2 * | 1/2022 | Huang ............... G02B 13/0045 |
| 11,846,759 | B2 * | 12/2023 | Chen .................. G02B 13/0045 |
| 2015/0316749 | A1 | 11/2015 | Chen |
| 2015/0319389 | A1 | 11/2015 | Huang |
| 2016/0041370 | A1 | 2/2016 | Lee et al. |
| 2016/0054543 | A1 | 2/2016 | Nabeta |
| 2016/0187622 | A1 | 6/2016 | Huang |
| 2017/0108665 | A1 | 4/2017 | Huang |
| 2017/0299846 | A1 | 10/2017 | Lin et al. |
| 2017/0307850 | A1 | 10/2017 | Jhang et al. |
| 2017/0322391 | A1 | 11/2017 | Kang et al. |
| 2018/0052304 | A1 | 2/2018 | Wu et al. |
| 2018/0180854 | A1 | 6/2018 | Huh et al. |
| 2018/0321472 | A1 | 11/2018 | Yeh |
| 2018/0335549 | A1 | 11/2018 | Dai et al. |
| 2019/0086642 | A1 | 3/2019 | Chen et al. |
| 2019/0094497 | A1 | 3/2019 | Huang |

FOREIGN PATENT DOCUMENTS

| | | | |
|---|---|---|---|
| CN | 105372788 | A | 3/2016 |
| CN | 105572848 | A | 5/2016 |
| CN | 106154495 | A | 11/2016 |
| CN | 107346057 | A | 11/2017 |
| CN | 107991761 | A | 5/2018 |
| CN | 207424363 | U | 5/2018 |
| JP | H11-101938 | A | 4/1999 |
| KR | 10-2018-0071948 | A | 6/2018 |
| TW | 201423143 | A | 6/2014 |
| TW | 1617834 | B | 3/2018 |

OTHER PUBLICATIONS

Chinese Office Action issued on Jan. 21, 2022, in counterpart Chinese Patent Application No. 201910255858.5 (6 pages in English, 7 pages in Chinese).

Chinese Office Action issued on Jan. 16, 2024, in counterpart Chinese Patent Application No. 202210960629.5 (1 page summary in English, 7 pages in Chinese).

U.S. Appl. No. 17/206,284, filed Mar. 19, 2021, Jin Hwa Jung et al., Samsung Electro-Mechanics Co., Ltd.

Chinese Office Action issued on May 10, 2025, in counterpart Chinese Patent Application No. 202210960627.6 (6 pages in English, 9 pages in Chinese).

Korean Office Action issued on Jul. 25, 2024, in counterpart Korean Patent Application No. 10-2018-0063714 (4 pages in English, 4 pages in Korean).

* cited by examiner

OPTICAL IMAGING SYSTEM

CROSS-REFERENCE TO RELATED APPLICATIONS

This application is a continuation of application Ser. No. 17/206,284 filed on Mar. 19, 2021, now U.S. Pat. No. 11,966,100 issued on Apr. 23, 2024, which is a continuation of application Ser. No. 16/237,819 filed on Jan. 2, 2019, now U.S. Pat. No. 10,983,306 issued on Apr. 20, 2021, and claims the benefit under 35 USC 119(a) of Korean Patent Application No. 10-2018-0063714 filed on Jun. 1, 2018, in the Korean Intellectual Property Office, the entire disclosures of which are incorporated herein by reference for all purposes.

BACKGROUND

The present disclosure relates to a telephoto optical imaging system comprised of six lenses.

A telephoto optical system capable of long-distance imaging has a considerable size. For example, a telephoto optical system has a ratio TL/f, of a total focal length f to a total length TL of the optical system, of 1 or more. Therefore, a telephoto optical system is difficult to mount in small electronic devices such as portable terminals, or the like. Further, with a telephoto optical system, it may be difficult to secure a sufficient amount of light incident on an imaging plane, such that it may be difficult to realize a low F No.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens, a second lens, a third lens including a concave object side surface, a fourth lens, a fifth lens, and a sixth lens sequentially disposed from an object side toward an image side. The optical imaging system satisfies 0.7<TL/f<1.0 and F No.<2.1, where TL is a distance from an object side of the first lens to an imaging plane, f is a total focal length of the optical imaging system, and F No. is the F No. of the optical imaging system.

The second lens may have a same sign of refractive power as a sign of refractive power of the first lens.

The third lens may have a different sign of refractive power from a sign of refractive power of the first lens.

The fifth lens may have a same sign of refractive power as a sign of refractive power of the third lens.

The sixth lens may have positive refractive power.

The second lens may include a convex object side surface.

The fifth lens may include a convex object side surface.

The optical imaging system may satisfy D45/TL<0.18, where D45 is a distance from an image side of the fourth lens to an object side of the fifth lens.

The optical imaging system may satisfy r1/r4<0.1, where r1 is a radius of curvature of the object side of the first lens, and r4 is a radius of curvature of an image side of the second lens.

In another general aspect, an optical imaging system includes a first lens, a second lens, a third, a fourth lens, a fifth lens, and a sixth lens including a convex image side surface, sequentially disposed from an object side to an image side. The optical imaging system satisfies 0.7<TL/f<1.0 and F No.<2.1, where TL is a distance from an object side of the first lens to an imaging plane, f is a total focal length of the optical imaging system, and F No. is the F No. of the optical imaging system.

The second lens may have positive refractive power.

The third lens may have negative refractive power.

The fifth lens may have a different sign of refractive power from a sign of refractive power of the second lens.

The second lens may include a convex object side surface.

The optical imaging system may satisfy 1.2<r2/r3, where r2 is a radius of curvature of an image side of the first lens, and r3 is a radius of curvature of an object side of the second lens.

The optical imaging system may satisfy 5.0<D12/D56, where D12 is a distance from an image side of the first lens to an object side of the second lens, and D56 is a distance from an image side of the fifth lens to an object side of the sixth lens.

In another general aspect, an optical imaging system includes a first lens, a second lens, a third lens, a fourth lens, a fifth lens, and a sixth lens sequentially disposed from an object side toward an image side. The first lens has positive refractive power and the third lens includes a concave object side surface.

The optical imaging system may satisfy 0.7<TL/f<1.0 and F No.<2.1, where TL is a distance from an object side of the first lens to an imaging plane, f is a total focal length of the optical imaging system, and F No. is the F No. of the optical imaging system.

The sixth lens may include a convex image side surface.

The sixth lens may include a concave image side surface.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
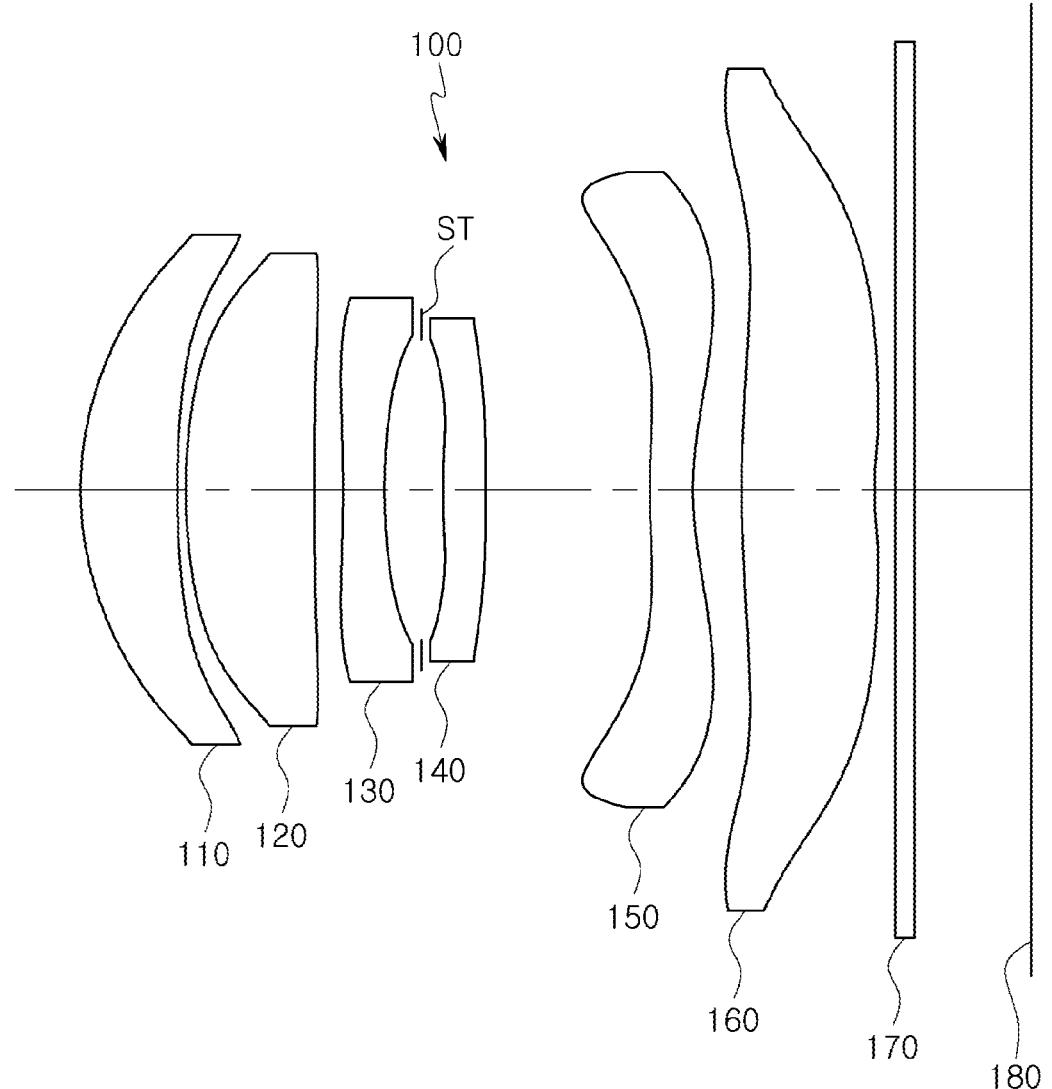
FIG. 1 is a configuration diagram of an optical imaging system according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

In the present disclosure, a first lens refers to a lens closest to an object (or a subject), and a sixth lens refers to a lens closest to an imaging plane (or an image sensor). In the present disclosure, a radius of curvature, a thickness, an IMG HT ($\frac{1}{2}$ of a diagonal length of the imaging plane), and a focal length of lenses are all indicated in millimeters (mm). Further, the thickness of the lenses, gaps between the lenses, and the TL are distances measured based on an optical axis of the lenses. Further, in a description for shapes of the lenses, one surface of a lens being convex means that an optical axis portion of a corresponding surface is convex, while one surface of a lens being concave means that an optical axis portion of a corresponding surface is concave. Therefore, even when one surface of the lens is described as having a convex shape, an edge portion of the lens may be concave. Likewise, even when one surface of the lens is described as having a concave shape, an edge portion of the lens may be convex.

An optical imaging system includes six lenses. For example, the optical imaging system may include a first lens, a second lens, third lens, a fourth lens, a fifth lens, and a sixth lens, sequentially disposed from an object side toward an image side. The first lens to the sixth lens are disposed with an air gap therebetween. For example, an object side of any lens does not contact an image side of the neighboring lens, and an image side of any lens does not contact the object side of the neighboring lens.

A first lens has refractive power. For example, the first lens has positive refractive power. The first lens has a concave shape on one surface. For example, the first lens may have a concave image side shape.

The first lens includes an aspherical surface. For example, both surfaces of the first lens may be aspherical. The first lens may be made of a material having high light transmittance and excellent workability. For example, the first lens may be made of a plastic material. However, the material of the first lens is not limited to the plastic material. The first lens has a relatively lower refractive index than that of the other lenses. For example, the refractive index of the first lens may be 1.6 or less.

A second lens has refractive power. For example, the second lens may have the same sign of refractive power as that of the first lens. The second lens may have a convex shape on one surface. For example, the second lens may have a convex object side shape.

The second lens includes an aspherical surface. For example, both surfaces of the second lens may be aspherical. The second lens may be made of a material having high light transmittance and excellent workability. For example, the second lens may be made of a plastic material. However, the material of the second lens is not limited to plastic. For example, the second lens may be also made of a glass material. The second lens has a refractive index substantially similar to that of the first lens. For example, the refractive index of the second lens is 1.6 or less.

A third lens has refractive power. For example, the third lens may have a different sign of refractive power than that of the first lens and the second lens. The third lens has a concave shape on one surface. For example, the third lens may have a concave shape on an object side.

The third lens may include an aspherical surface. For example, both surfaces of the third lens may be aspherical. The third lens may be made of a material having high light transmittance and excellent workability. For example, the third lens may be made of a plastic material. However, the material of the third lens is not limited to plastic. For example, the third lens may be made of a glass material. The third lens may have a higher refractive index than that of the first lens. For example, the refractive index of the third lens may be 1.6 or more.

A fourth lens has refractive power. For example, the fourth lens has positive refractive power. The fourth lens has a convex shape on one surface. For example, the fourth lens may have a convex shape on an image side. The fourth lens may include an aspherical surface. For example, both surfaces of the fourth lens may be aspherical.

The fourth lens may be made of a material having high light transmittance and excellent workability. For example, the fourth lens may be made of a plastic material. However, the material of the fourth lens is not limited to plastic. For example, the fourth lens may be made of a glass material. The fourth lens may have a higher refractive index than that of the first lens. For example, the refractive index of the fourth lens may be 1.6 or more.

A fifth lens has refractive power. For example, the fifth lens has refractive power different from that of the second lens. Also, the fifth lens may have the same sign of refractive power as that of the third lens. The fifth lens has a convex shape on one surface. For example, the fifth lens may have a convex object side shape.

The fifth lens includes an aspherical surface. For example, both surfaces of the fifth lens may be aspherical. The fifth lens may be made of a material having high light transmittance and excellent workability. For example, the fifth lens may be made of a plastic material. However, the material of the fifth lens is not limited to plastic. For example, the fifth lens may be made of a glass material. The fifth lens has a refractive index substantially similar to that of the first lens. For example, the refractive index of the fifth lens is 1.6 or less.

A sixth lens has refractive power. For example, the sixth lens positive refractive power. The sixth lens may have a convex shape on one surface. For example, the sixth lens may have a convex object side shape.

The sixth lens includes an aspherical surface. For example, both surfaces of the sixth lens may be aspherical. The sixth lens may be made of a material having high light transmittance and excellent workability. For example, the sixth lens may be made of a plastic material. However, the material of the sixth lens is not limited to plastic. For example, the sixth lens may be made of a glass material. The sixth lens has a higher refractive index than that of the first lens. For example, the refractive index of the sixth lens may be 1.6 or more.

The aspherical surface of the first lens to the sixth lens may be represented by the following Equation 1:

$$Z = \frac{cr^2}{1 + \sqrt{1 - (1+k)c^2r^2}} + Ar^4 + \tag{1}$$

6

-continued
$$Br^6 + Cr^8 + Dr^{10} + Er^{12} + Fr^{14} + Gr^{16} + Hr^{18} + Jr^{20}$$

In Equation 1, c is a reciprocal of the radius of curvature of the lens, k is a conic constant, r is a distance from any point on an aspherical surface to an optical axis, A through H and J are aspherical surface constants, and Z (or SAG) is a height in an optical axis direction from any point on the aspherical surface to an apex of the aspherical surface.

The optical imaging system includes a filter, an image sensor, and a stop. The filter is disposed between the sixth lens and the image sensor. The filter may block some wavelengths of light. For example, the filter may block infrared light wavelengths. The image sensor forms an imaging plane. For example, the surface of the image sensor may form the imaging plane. The stop is disposed to adjust an amount of light incident to the lens. For example, the stop is disposed between the third lens and the fourth lens.

The optical imaging system is configured to satisfy at least one of the following conditional expressions:

| | |
|---|---|
| $0.7 < TL/f < 1.0$ | (Conditional Expression 1) |
| $F No. < 2.1$ | (Conditional Expression 2) |
| $D45/TL < 0.18$ | (Conditional Expression 3) |
| $r1/r4 < 0.1$ | (Conditional Expression 4) |
| $1.2 < r2/r3$ | (Conditional Expression 5) |
| $5.0 < D12/D56$ | (Conditional Expression 6) |
| $1.6 < D45/D34$ | (Conditional Expression 7) |
| $0.1 < r1/r11 < 0.3$ | (Conditional Expression 8) |

In the conditional expressions, TL is a distance from an object side of the first lens to an imaging plane, f is an total focal length of the optical imaging system, D12 is a distance from an object side of the first lens to an image side of the second lens, D34 is a distance from an object side of the third lens to an image side of the fourth lens, D45 is a distance from an object side of the fourth lens to an image side of the fifth lens, D56 is a distance from an object side of the fifth lens to an image side of the sixth lens, r1 is a radius of curvature of an object side of the first lens, r2 is a radius of curvature of an image side of the first lens, r3 is a radius of curvature of an object side of the second lens, r4 is a radius of curvature of an image side of the second lens, and r11 is a radius of curvature of an object side of the sixth lens.

Conditional expression 1 provides a condition for mounting the optical imaging system on small terminals. An optical imaging system that does not satisfy conditional expression 1 is difficult to mount on small terminals and/or has difficulty exhibiting telephoto performance.

Conditional expression 3 provides a condition regarding telephoto performance and resolution. An optical system deviating from a numerical range of conditional expression 3 has poor telephoto performance and/or EH is difficult to realize high resolution.

Conditional expression 4 provides a condition regarding sensitivity and aberration. An optical system deviating from a numerical range of conditional expression 4 has high sensitivity such that correction of the aberration is difficult.

Optical imaging systems according to various examples will be described.

An optical imaging system according to an example will be described with reference to FIG. 1.

An optical imaging system 100 includes a first lens 110, a second lens 120, a third lens 130, a fourth lens 140, a fifth lens 150, and a sixth lens 160.

The first lens 110 has positive refractive power, an object side thereof is convex and an image side thereof is concave. The second lens 120 has positive refractive power, an object side thereof is convex and an image side thereof is concave. The third lens 130 has negative refractive power, an object side thereof is concave and an image side thereof is concave. The third lens 130 has a shape in which an inflection point is formed on the object side and the image side. The fourth lens 140 has positive refractive power, an object side thereof is convex and an image side thereof is convex. The fifth lens 150 has negative refractive power, and an object side thereof is convex and an image side thereof is concave. The fifth lens 150 has a shape in which an inflection point is formed on the object side and the image side. The sixth lens 160 has positive refractive power, an object side thereof is convex, and an image side thereof is concave. The sixth lens 160 has a shape in which an inflection point is formed on the object side and the image side.

The optical imaging system 100 includes a filter 170, an image sensor 180, and a stop ST. The filter 170 is disposed between the sixth lens 160 and the image sensor 180, and the stop ST is disposed between the third lens 130 and the fourth lens 140.

Figure 2:
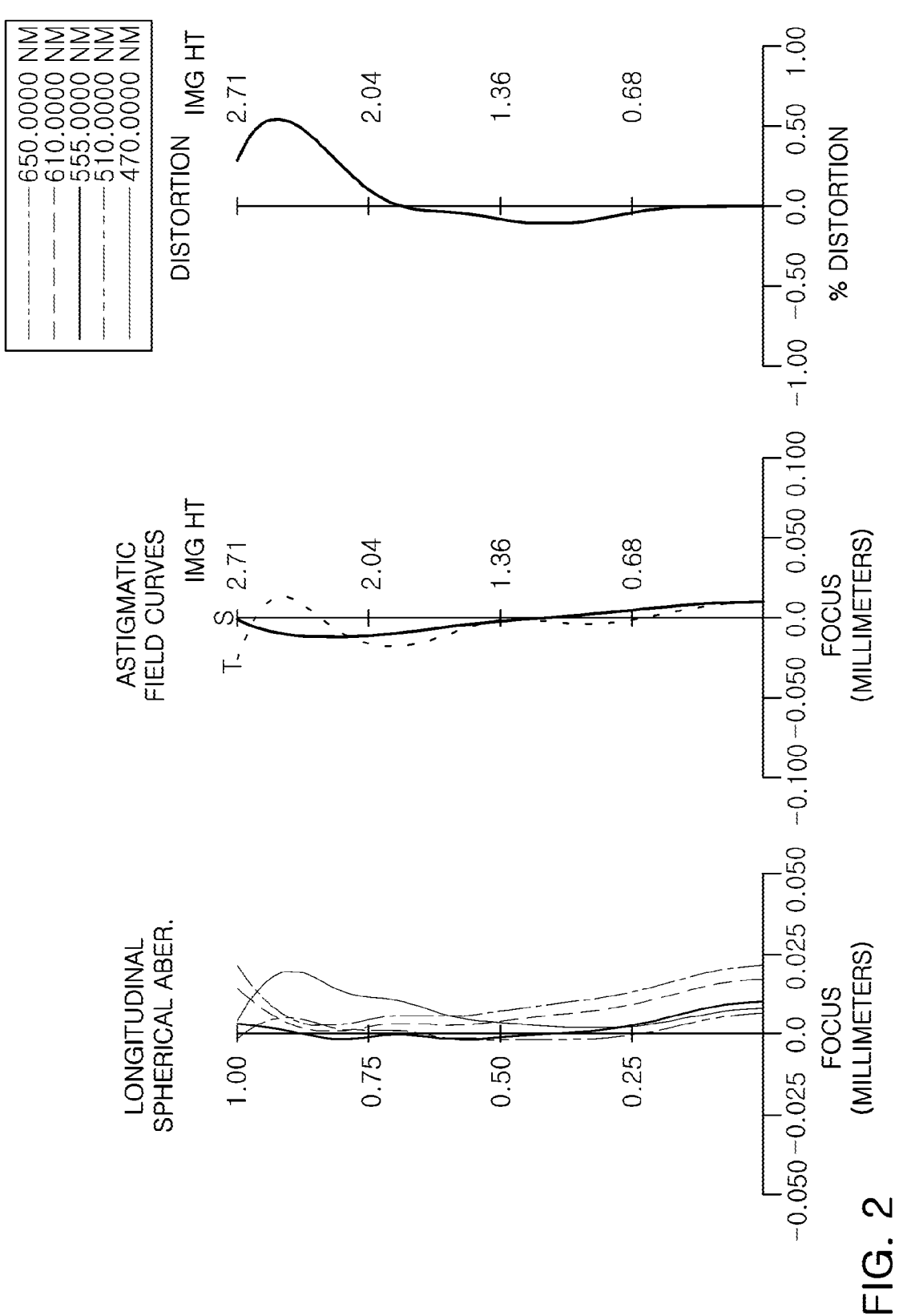
FIG. 2 is a graph representing aberration curves of the optical imaging system illustrated in FIG. 1.

The optical imaging system 100 represents aberration characteristics as illustrated in FIG. 2. Table 1 and Table 2 represent the lens characteristics and aspherical surface values of the optical imaging system 100.

TABLE 1

First Example
f = 5.750 FOV = 48.86 TL = 5.500

| Surface No. | Element | Radius of Curvature | Thickness/ Distance | Focal length | Refractive Index | Abbe No. |
|---|---|---|---|---|---|---|
| S1 | 1st lens | 1.7786 | 0.5589 | 4.772 | 1.544 | 56.00 |
| S2 | | 4.9836 | 0.0500 | | | |
| S3 | 2nd lens | 3.1038 | 0.7414 | 6.528 | 1.544 | 56.00 |
| S4 | | 22.0293 | 0.1679 | | | |
| S5 | 3rd lens | −10.3019 | 0.2400 | −3.823 | 1.661 | 20.40 |
| S6 | | 3.4176 | 0.2133 | | | |
| S7 | Stop | infinity | 0.1400 | | | |
| S8 | 4th lens | 37.7301 | 0.2300 | 36.083 | 1.671 | 19.40 |
| S9 | | −69.1004 | 0.9529 | | | |
| S10 | 5th lens | 5.4882 | 0.2500 | −5.567 | 1.544 | 56.00 |
| S11 | | 1.9245 | 0.2810 | | | |
| S12 | 6th lens | 6.2840 | 0.7854 | 13.984 | 1.650 | 21.50 |
| S13 | | 18.9812 | 0.1027 | | | |
| S14 | Filter | infinity | 0.1100 | | 1.519 | 64.20 |
| S15 | | infinity | 0.6863 | | | |
| S16 | Imaging plane | infinity | −0.0100 | | | |

TABLE 2

| Surface No. | S1 | S2 | S3 | S4 | S5 | S6 |
|---|---|---|---|---|---|---|
| Radius of Curvature | 1.7786 | 4.9836 | 3.1038 | 22.0293 | −10.3019 | 3.4176 |
| k | −0.1592 | 5.8119 | 1.1896 | −1.0000 | −1.0000 | 1.2024 |
| A | −0.0072 | −0.0287 | −0.0157 | −0.0149 | 0.0389 | 0.0167 |

TABLE 2-continued

| | | | | | | |
|---|---|---|---|---|---|---|
| B | −0.0035 | 0.0837 | 0.0924 | 0.0446 | 0.0908 | 0.1451 |
| C | 0.0005 | −0.0390 | −0.0262 | −0.0507 | −0.1602 | −0.3403 |
| D | 0.0037 | 0.0241 | −0.0009 | 0.0236 | 0.1517 | 0.7485 |
| E | −0.0012 | −0.0148 | −0.0006 | −0.0045 | −0.0591 | −0.9727 |
| F | −0.0003 | 0.0028 | 0.0000 | 0.0000 | 0.0035 | 0.7674 |
| G | 0.0000 | 0.0000 | 0.0000 | 0.0000 | 0.0034 | −0.2158 |
| H | 0.0000 | 0.0000 | 0.0000 | 0.0000 | 0.0000 | 0.0000 |
| J | 0.0000 | 0.0000 | 0.0000 | 0.0000 | 0.0000 | 0.0000 |

| Surface No. | S8 | S9 | S10 | S11 | S12 | S13 |
|---|---|---|---|---|---|---|
| Radius of Curvature | 37.7301 | −69.1004 | 5.4882 | 1.9245 | 6.2840 | 18.9812 |
| k | 0.0000 | 0.0000 | 0.0000 | 0.0000 | 0.0000 | −1.0000 |
| A | −0.2173 | −0.1440 | −0.2074 | −0.2455 | −0.0759 | −0.0826 |
| B | 0.0765 | 0.0789 | 0.0514 | 0.1419 | 0.0722 | 0.0349 |
| C | −0.3247 | −0.1074 | 0.0086 | −0.0893 | −0.0461 | −0.0105 |
| D | 1.0128 | 0.2148 | −0.0178 | 0.0375 | 0.0149 | 0.0011 |
| E | −1.7097 | −0.1057 | 0.0127 | −0.0103 | −0.0025 | 0.0001 |
| F | 1.6896 | 0.0000 | −0.0048 | 0.0016 | 0.0002 | 0.0000 |
| G | −0.7332 | 0.0000 | 0.0007 | −0.0001 | 0.0000 | 0.0000 |
| H | 0.0000 | 0.0000 | 0.0000 | 0.0000 | 0.0000 | 0.0000 |
| J | 0.0000 | 0.0000 | 0.0000 | 0.0000 | 0.0000 | 0.0000 |

Figure 3:
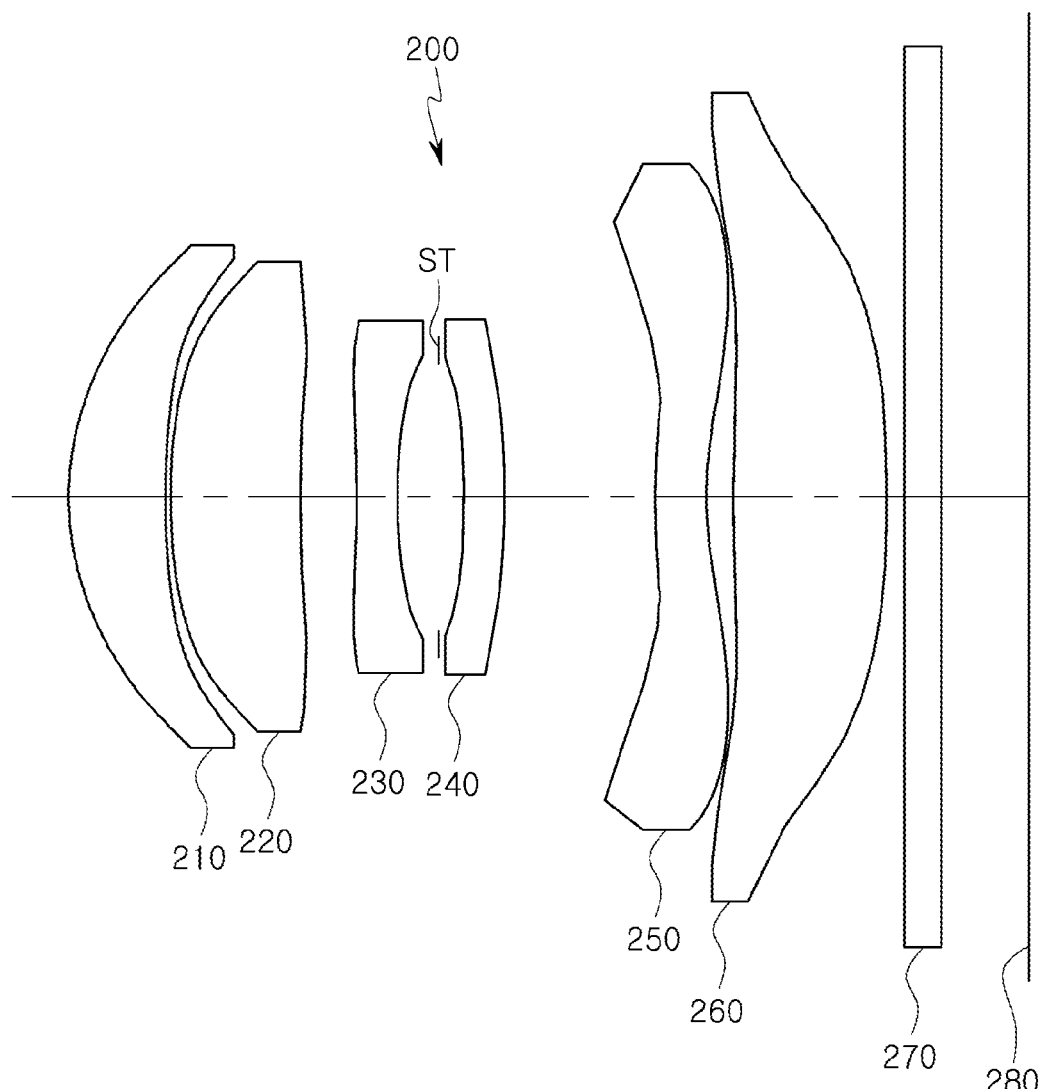
FIG. 3 is a configuration diagram of an optical imaging system according to an example.

An optical imaging system according to another example will be described with reference to FIG. 3.

An optical imaging system 200 includes a first lens 210, a second lens 220, a third lens 230, a fourth lens 240, a fifth lens 250, and a sixth lens 260.

The first lens 210 has positive refractive power, an object side thereof is convex and an image side thereof is concave. The second lens 220 has positive refractive power, an object side thereof is convex and an image side thereof is concave. The third lens 230 has negative refractive power, an object side thereof is concave and an image side thereof is concave. The third lens 230 has a shape in which an inflection point is formed on the object side and the image side. The fourth lens 240 has positive refractive power, an object side thereof is concave and an image side thereof is convex. The fifth lens 250 has negative refractive power, an object side thereof is convex and an image side thereof is concave. The fifth lens 250 has a shape in which an inflection point is formed on the object side and the image side. The sixth lens 260 has positive refractive power, an object side thereof is convex, and an image side thereof is convex. The sixth lens 260 has a shape in which an inflection point is formed on the object side and the image side.

The optical imaging system 200 includes a filter 270, an image sensor 280, and a stop ST. The filter 270 is disposed between the sixth lens 260 and the image sensor 280, and the stop ST is disposed between the third lens 230 and the fourth lens 240.

Figure 4:
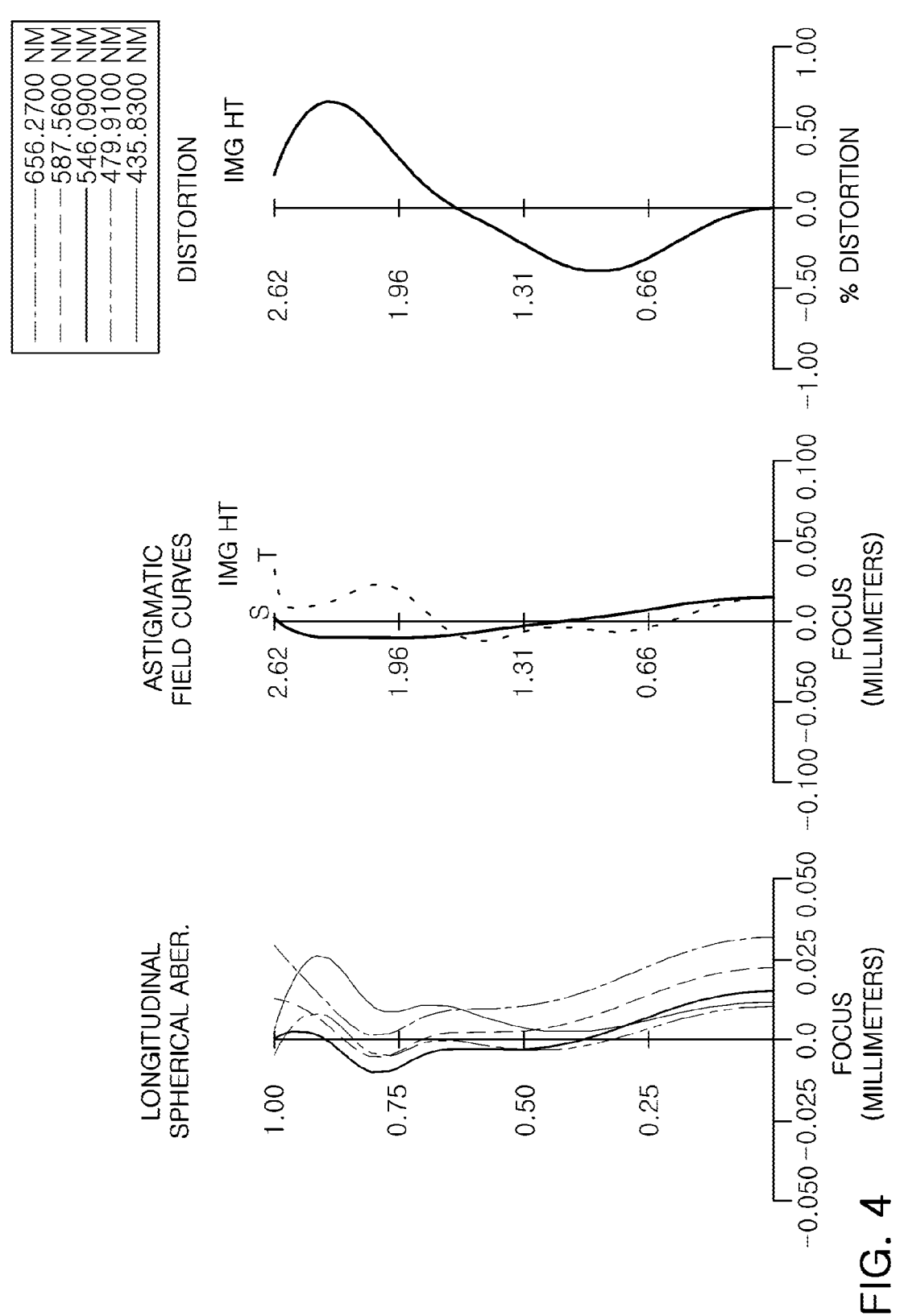
FIG. 4 is a graph representing aberration curves of the optical imaging system illustrated in FIG. 3.

The optical imaging system 200 represents aberration characteristics as illustrated in FIG. 4. Table 3 and Table 4 represent the lens characteristics and aspherical surface values of the optical imaging system 200.

TABLE 3

Second Example
f = 5.750 FOV = 49.06 TL = 5.410

| Surface No. | Element | Radius of Curvature | Thickness/ Distance | Focal length | Refractive Index | Abbe No. |
|---|---|---|---|---|---|---|
| S1 | 1st lens | 1.6895 | 0.5440 | | 1.544 | 56.00 |
| S2 | | 4.4223 | 0.0300 | 4.674 | | |
| S3 | 2nd lens | 3.2222 | 0.7712 | | 1.544 | 56.00 |

9

TABLE 3-continued

Second Example
f = 5.750 FOV = 49.06 TL = 5.410

| Surface No. | Element | Radius of Curvature | Thickness/ Distance | Focal length | Refractive Index | Abbe No. |
|---|---|---|---|---|---|---|
| S4 | | 265.4716 | 0.2760 | 5.962 | | |
| S5 | 3rd lens | −7.3340 | 0.2300 | | 1.661 | 20.40 |
| S6 | | 3.4564 | 0.2335 | −3.485 | | |
| S7 | Stop | infinity | 0.1400 | | | |
| S8 | 4th lens | −8.2603 | 0.2301 | 40.990 | 1.671 | 19.40 |
| S9 | | −6.4413 | 0.8882 | | | |
| S10 | 5th lens | 14.7984 | 0.2500 | −4.336 | 1.544 | 56.00 |
| S11 | | 2.0302 | 0.1540 | | | |
| S12 | 6th lens | 11.7001 | 0.8620 | 8.772 | 1.650 | 21.50 |
| S13 | | −11.0395 | 0.1000 | | | |
| S14 | Filter | infinity | 0.2100 | | 1.519 | 64.20 |
| S15 | | infinity | 0.5061 | | | |
| S16 | Imaging plane | infinity | −0.0150 | | | |

TABLE 4

| Surface No. | S1 | S2 | S3 | S4 | S5 | S6 |
|---|---|---|---|---|---|---|
| Radius of Curvature | 1.6895 | 4.4223 | 3.2222 | 265.4716 | −7.3340 | 3.4564 |
| k | −0.0096 | 6.8208 | 1.6967 | −1.0000 | −1.0000 | 4.5330 |
| A | −0.0120 | −0.0703 | −0.0587 | −0.0230 | 0.0370 | 0.0330 |
| B | −0.0028 | 0.1647 | 0.1710 | 0.0367 | 0.1078 | 0.0988 |
| C | −0.0056 | −0.1039 | −0.0867 | −0.0304 | −0.1449 | 0.0315 |
| D | 0.0108 | 0.0558 | 0.0212 | 0.0110 | 0.0991 | −0.2377 |
| E | −0.0055 | −0.0262 | −0.0038 | −0.0021 | −0.0183 | 0.3026 |
| F | 0.0006 | 0.0049 | 0.0000 | 0.0000 | 0.0000 | 0.0000 |
| G | 0.0000 | 0.0000 | 0.0000 | 0.0000 | 0.0000 | 0.0000 |
| H | 0.0000 | 0.0000 | 0.0000 | 0.0000 | 0.0000 | 0.0000 |
| J | 0.0000 | 0.0000 | 0.0000 | 0.0000 | 0.0000 | 0.0000 |

| Surface No. | S8 | S9 | S10 | S11 | S12 | S13 |
|---|---|---|---|---|---|---|
| Radius of Curvature | −8.2603 | −6.4413 | 14.7984 | 2.0302 | 11.7001 | −11.0395 |
| k | 0.0000 | 0.0000 | 0.0000 | 0.0000 | 0.0000 | −1.0000 |
| A | −0.1704 | −0.0880 | −0.1870 | −0.2425 | −0.0679 | −0.0814 |
| B | 0.0230 | 0.0581 | 0.0217 | 0.1625 | 0.0965 | 0.0427 |
| C | −0.0312 | −0.0092 | 0.1272 | −0.0975 | −0.0924 | −0.0157 |
| D | 0.1046 | 0.0517 | −0.1279 | 0.0387 | 0.0438 | 0.0009 |
| E | −0.1353 | −0.0419 | 0.0583 | −0.0101 | −0.0108 | 0.0009 |
| F | 0.0000 | 0.0000 | −0.0133 | 0.0016 | 0.0014 | −0.0002 |
| G | 0.0000 | 0.0000 | 0.0012 | −0.0001 | −0.0001 | 0.0000 |
| H | 0.0000 | 0.0000 | 0.0000 | 0.0000 | 0.0000 | 0.0000 |
| J | 0.0000 | 0.0000 | 0.0000 | 0.0000 | 0.0000 | 0.0000 |

Figure 5:
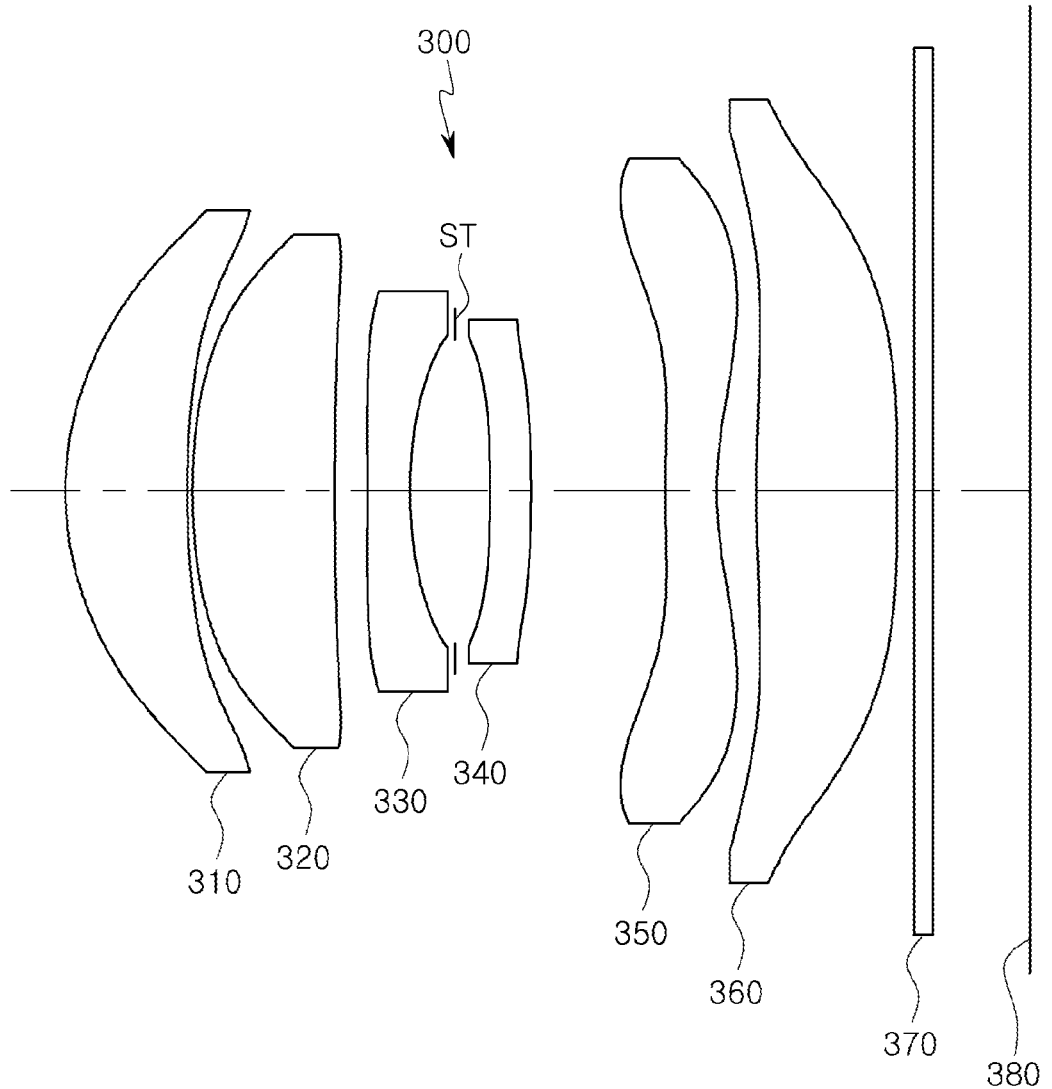
FIG. 5 is a configuration diagram of an optical imaging system according to an example.

An optical imaging system according to another example will be described with reference to FIG. 5.

An optical imaging system 300 includes a first lens 310, a second lens 320, a third lens 330, a fourth lens 340, a fifth lens 350, and a sixth lens 360.

The first lens 310 has positive refractive power, an object side thereof is convex and an image side thereof is concave. The second lens 320 has positive refractive power, an object side thereof is convex and an image side thereof is concave. The third lens 330 has negative refractive power, an object side thereof is concave and an image side thereof is concave. The third lens 330 has a shape in which an inflection point is formed on the object side and the image side. The fourth lens 340 has positive refractive power, an object side thereof is concave and an image side thereof is convex. The fifth lens 350 has negative refractive power, an object side thereof is convex and an image side thereof is concave. The fifth lens 350 has a shape in which an inflection point is formed on the object side and the image side. The sixth lens 360 has positive refractive power, an object side thereof is convex, and an image side thereof is convex. The sixth lens 360 has a shape in which an inflection point is formed on the object side and the image side.

The optical imaging system 300 includes a filter 370, an image sensor 380, and a stop ST. The filter 370 is disposed between the sixth lens 360 and the image sensor 380, and the stop ST is disposed between the third lens 330 and the fourth lens 340.

Figure 6:
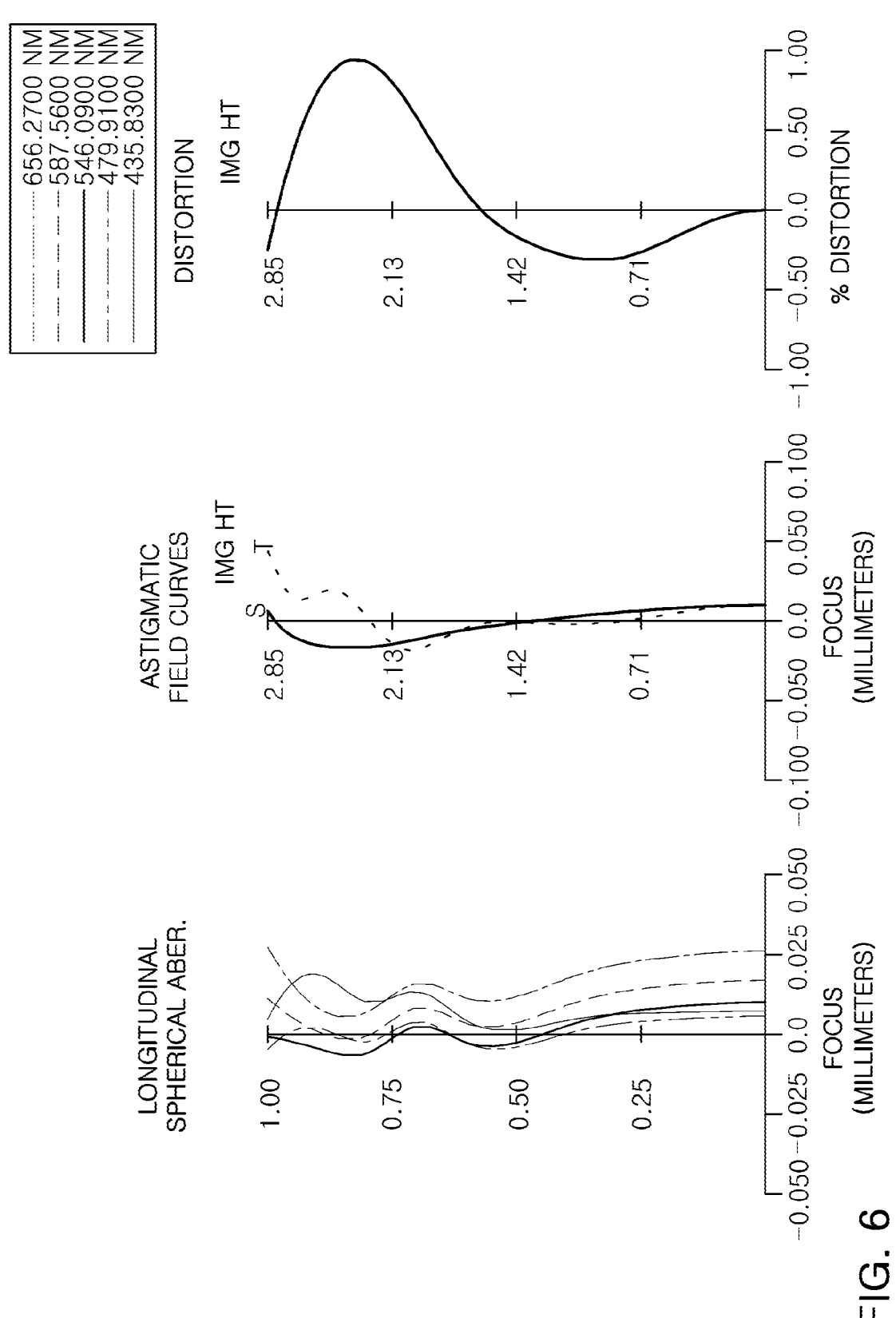
FIG. 6 is a graph representing aberration curves of the optical imaging system illustrated in FIG. 5.

The optical imaging system 300 represents aberration characteristics as illustrated in FIG. 6. Table 5 and Table 6 represent the lens characteristics and aspherical surface values of the optical imaging system 300.

TABLE 5

Third Example
f = 5.850 FOV = 52.18 TL = 5.619

| Surface No. | Element | Radius of Curvature | Thickness/ Distance | Focal length | Refractive Index | Abbe No. |
|---|---|---|---|---|---|---|
| S1 | 1st lens | 1.8778 | 0.7092 | 4.745 | 1.544 | 56.00 |
| S2 | | 5.8990 | 0.0300 | | | |
| S3 | 2nd lens | 3.2780 | 0.8280 | 6.696 | 1.544 | 56.00 |
| S4 | | 28.6602 | 0.1905 | | | |
| S5 | 3rd lens | −42.6837 | 0.2500 | −3.758 | 1.661 | 20.40 |
| S6 | | 2.6748 | 0.2607 | | | |
| S7 | Stop | infinity | 0.2035 | | | |
| S8 | 4th lens | −11.3859 | 0.2400 | 88.829 | 1.671 | 19.40 |
| S9 | | −9.6592 | 0.7807 | | | |
| S10 | 5th lens | 7.5899 | 0.3000 | −5.313 | 1.544 | 56.00 |
| S11 | | 2.0709 | 0.2301 | | | |
| S12 | 6th lens | 7.6736 | 0.8192 | 10.889 | 1.650 | 21.50 |
| S13 | | −102.1288 | 0.1001 | | | |
| S14 | Filter | infinity | 0.1100 | | 1.519 | 64.20 |
| S15 | | infinity | 0.5769 | | | |
| S16 | Imaging plane | infinity | −0.0100 | | | |

TABLE 6

| Surface No. | S1 | S2 | S3 | S4 | S5 | S6 |
|---|---|---|---|---|---|---|
| Radius of Curvature | 1.8778 | 5.8990 | 3.2780 | 28.6602 | −42.6837 | 2.6748 |
| k | 0.0724 | 7.4284 | 1.1998 | −1.0000 | −1.0000 | 0.5899 |
| A | −0.0085 | 0.0076 | 0.0150 | −0.0040 | 0.0391 | 0.0500 |
| B | −0.0011 | 0.0174 | 0.0140 | 0.0116 | 0.0005 | −0.0246 |
| C | −0.0010 | −0.0147 | 0.0020 | −0.0049 | −0.0059 | 0.1076 |
| D | −0.0007 | 0.0138 | −0.0003 | 0.0005 | 0.0067 | −0.1538 |
| E | 0.0009 | −0.0067 | −0.0006 | −0.0002 | −0.0003 | 0.1116 |
| F | −0.0003 | 0.0010 | 0.0000 | 0.0000 | 0.0000 | 0.0000 |

TABLE 6-continued

| | | | | | | |
|---|---|---|---|---|---|---|
| G | 0.0000 | 0.0000 | 0.0000 | 0.0000 | 0.0000 | 0.0000 |
| H | 0.0000 | 0.0000 | 0.0000 | 0.0000 | 0.0000 | 0.0000 |
| J | 0.0000 | 0.0000 | 0.0000 | 0.0000 | 0.0000 | 0.0000 |

| Surface No. | S8 | S9 | S10 | S11 | S12 | S13 |
|---|---|---|---|---|---|---|
| Radius of Curvature | −11.3859 | −9.6592 | 7.5899 | 2.0709 | 7.6736 | −102.1288 |
| k | 0.0000 | 0.0000 | 0.0000 | 0.0000 | 0.0000 | −1.0000 |
| A | −0.1346 | −0.0907 | −0.1656 | −0.2114 | −0.0863 | −0.0966 |
| B | 0.0418 | 0.0695 | 0.0340 | 0.1168 | 0.0861 | 0.0527 |
| C | −0.1761 | −0.1077 | 0.0145 | −0.0689 | −0.0644 | −0.0275 |
| D | 0.2858 | 0.1630 | −0.0095 | 0.0270 | 0.0274 | 0.0095 |
| E | −0.1473 | −0.0638 | 0.0030 | −0.0065 | −0.0066 | −0.0020 |
| F | 0.0000 | 0.0000 | −0.0006 | 0.0009 | 0.0009 | 0.0002 |
| G | 0.0000 | 0.0000 | 0.0001 | 0.0000 | 0.0000 | 0.0000 |
| H | 0.0000 | 0.0000 | 0.0000 | 0.0000 | 0.0000 | 0.0000 |
| J | 0.0000 | 0.0000 | 0.0000 | 0.0000 | 0.0000 | 0.0000 |

Table 7 represents the conditional expression values of the optical imaging system according to the examples described above.

TABLE 7

| Conditional Expression | First Example | Second Example | Third Example |
|---|---|---|---|
| TL/f | 0.9565 | 0.9409 | 0.9605 |
| F No. | 2.0000 | 2.0100 | 1.7700 |
| D45/TL | 0.1733 | 0.1642 | 0.1389 |
| r1/r4 | 0.0807 | 0.0064 | 0.0655 |
| r2/r3 | 1.6056 | 1.3724 | 1.7996 |
| D12/D56 | 5.6205 | 5.1346 | 7.6700 |
| D45/D34 | 2.6970 | 2.3781 | 1.6817 |
| r1/r11 | 0.2830 | 0.1444 | 0.2447 |

The lenses of the above-described optical imaging systems have a focal length in a predetermined (certain) range. For example, the focal length of the first lens is in the range of 4.0 to 5.4 mm, the focal length of the second lens is in the range of 5.0 to 8.0 mm, the focal length of the third lens is in the range of −5.0 to −3.0 mm, the focal length of the fourth lens is in a range higher than 30 mm, the focal length of the fifth lens is in a range of −5.0 to −3.5 mm, and the focal length of the sixth lens is in a range of 8.0 to 15 mm.

An optical imaging system according to the various examples described herein may be mounted on small terminals while being capable of long-distance image capturing may be realized.

An optical imaging system according to the various examples described herein provides an optical imaging system having a low F No., which may be mounted on small terminals while being capable of long-distance image capturing.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
a first lens having a concave image-side surface in an optical axis region thereof;
a second lens having a refractive power;
a third lens having a refractive power;
a fourth lens having a refractive power;
a fifth lens having a convex object-side surface in an optical axis region thereof; and
a sixth lens having a refractive power,
wherein the first to sixth lenses are sequentially disposed in ascending numerical order along an optical axis of the optical imaging system from an object side of the optical imaging system toward an imaging plane of the optical imaging system,
an f-number of the optical imaging system is less than 2.10, and
a radius of curvature of an image-side surface of the second lens at the optical axis is greater than a radius of curvature of the image-side surface of the first lens at the optical axis.

2. The optical imaging system of claim 1, wherein the first lens has a convex object-side surface in an optical axis region thereof.

3. The optical imaging system of claim 1, wherein the second lens has a convex object-side surface in an optical axis region thereof.

4. The optical imaging system of claim 1, wherein the image-side surface of the second lens is concave in an optical axis region thereof.

5. The optical imaging system of claim 1, wherein the fourth lens has a convex object-side surface in an optical axis region thereof.

6. An optical imaging system comprising:
a first lens having a refractive power;
a second lens having a refractive power;
a third lens having a concave object-side surface in an optical axis region thereof;
a fourth lens having a refractive power;
a fifth lens having a convex object-side surface in an optical axis region thereof; and
a sixth lens having a refractive power, wherein the first to sixth lenses are sequentially disposed in ascending numerical order along an optical axis of the optical imaging system from an object side of the optical imaging system toward an imaging plane of the optical imaging system, 0.7<TL/f<1.0, where TL is a distance along the optical axis from an object-side surface of the first lens to the imaging plane, and f is a total focal length of the optical imaging system, and a radius of curvature of an image-side surface of the second lens at the optical axis is greater than a radius of curvature of an image-side surface of the first lens at the optical axis.

7. The optical imaging system of claim 6, wherein the object-side surface of the first lens is convex in an optical axis region thereof.

8. The optical imaging system of claim 6, wherein the image-side surface of the second lens is concave in an optical axis region thereof.

9. The optical imaging system of claim 6, wherein the third lens has a concave image-side surface in an optical axis region thereof.

10. The optical imaging system of claim 6, wherein the fourth lens has a convex object-side surface in an optical axis region thereof.

11. The optical imaging system of claim 6, wherein the fifth lens has a concave image-side surface in an optical axis region thereof.

12. The optical imaging system of claim 6, wherein the sixth lens has a convex image-side surface in an optical axis region thereof.

* * * * *